US010649972B2

(12) United States Patent
Lima et al.

(10) Patent No.: US 10,649,972 B2
(45) Date of Patent: May 12, 2020

(54) COMPLEX CATALOG MATCH SYSTEM

(71) Applicant: CooperVision International Holding Company, LP, St. Michael (BB)

(72) Inventors: Joe Lima, San Diego, CA (US); Tawnya Bordalo, San Diego, CA (US); Niklas Sletteland, San Diego, CA (US); Daniel Eisenbarger, San Diego, CA (US); Preston Resenbeck, San Diego, CA (US); Shaun Schooley, Moraga, CA (US); Eric Rozran, Livermore, CA (US)

(73) Assignee: COOPERVISION INTERNATIONAL HOLDING COMPANY, LP, St. Michael (BB)

( * ) Notice: Subject to any disclaimer, the term of this patent is extended or adjusted under 35 U.S.C. 154(b) by 336 days.

(21) Appl. No.: 15/798,157

(22) Filed: Oct. 30, 2017

(65) Prior Publication Data

US 2019/0129987 A1 May 2, 2019

(51) Int. Cl.
*G06F 16/00* (2019.01)
*G06F 16/22* (2019.01)
(Continued)

(52) U.S. Cl.
CPC ...... *G06F 16/2282* (2019.01); *G06F 16/5866* (2019.01); *G06F 16/9017* (2019.01);
(Continued)

(58) Field of Classification Search
CPC ............. G06F 16/9017; G06F 16/5866; G06F 16/2282; G06F 16/9535; G06N 5/022
See application file for complete search history.

(56) References Cited

U.S. PATENT DOCUMENTS 5,694,551 A * 12/1997 Doyle .................. G06Q 10/087
705/26.62
6,751,600 B1 * 6/2004 Wolin ................... G06F 16/353
706/12
(Continued)

FOREIGN PATENT DOCUMENTS

TW    I506459 B    11/2015

OTHER PUBLICATIONS

PCT/GB2018/052902—International Search Report and Written Opinion dated Nov. 26, 2018, 16 pages.
(Continued)

*Primary Examiner* — Cheryl Lewis
(74) *Attorney, Agent, or Firm* — Haynes Beffel & Wolfeld LLP

(57) ABSTRACT

Systems and techniques are provided for a data matching system having a plurality of clients and a master catalog. In a learning phase of a client, the data matching system builds a client matching table for the client and matches the input request to a specific entry in a particular set of entries in the master catalog. In a post-learning phase of the client, the data matching system uses the client matching table to match the input request to a specific entry in a particular set of entries in the master catalog. In a specific implementation, the data matching system uses a two-step match to build the client matching table. In a first step, a plurality of a set of entries in the master catalog is selected for the input request. In a second step, a particular set of entries is selected using a confidence score.

44 Claims, 8 Drawing Sheets

(51) Int. Cl.
  *G06F 16/9535* (2019.01)
  *G06F 16/901* (2019.01)
  *G06F 16/58* (2019.01)
  *G06N 5/02* (2006.01)
  *G06N 20/00* (2019.01)

(52) U.S. Cl.
  CPC ......... *G06F 16/9535* (2019.01); *G06N 5/022* (2013.01); *G06N 20/00* (2019.01)

(56) References Cited

U.S. PATENT DOCUMENTS

| | | |
|---|---|---|
| 9,710,491 B2 | 7/2017 | Ke et al. |
| 2004/0088283 A1 | 5/2004 | Lissar et al. |
| 2005/0076003 A1 | 4/2005 | DuBose et al. |
| 2007/0226255 A1 | 9/2007 | Anderson |
| 2010/0299234 A1* | 11/2010 | Stone ............ G06Q 10/087 |
| | | 705/30 |
| 2013/0031119 A1* | 1/2013 | Kang ............ G06F 16/25 |
| | | 707/758 |
| 2016/0012135 A1 | 1/2016 | Wang et al. |
| 2017/0255653 A1 | 9/2017 | Zhu et al. |

OTHER PUBLICATIONS

Lens Ferry 1 page Sales Handout, Sales Materials, at least as early as May 25, 2017, 1 page.
Lensferry basics, Sales Materials, at least as early as May 25, 2017, 1 page.
LensFerry Sales Deck, Sales Materials, v4, at least as early as May 25, 2017, 19 pages.
PCT/GB20181052902—International Preliminary Report on Patentability dated Dec. 20, 2019, 32 pages.
TW Office Action from Appln. No. 107135976 dated Jan. 20, 2020, 14 pages.

* cited by examiner

600

```
▼ left                              ( 8 fields )
     productName                    Proclear Dailies 8.70 14.2 -6.00
     baseCurve                      8.70
     diameter                       14.2
     color
     power                          -6.00
     series      ⌒ Request Field 610    Proclear Dailies   ⌒ Input Variant
     quantity                       4                              612
     trial                          0
▼ right                             ( 8 fields )
     productName                    Proclear Dailies 8.70 14.2 -6.00
     baseCurve                      8.70
     diameter                       14.2
     color
     power                          -6.00
     series                         Proclear Dailies
     quantity                       4
     trial                          0
```

Example of Input Request

| Field | Value | Type |
|---|---|---|
| _id | ObjectId("5494a87c0f85af7ed25cf992") | ObjectId |
| productId | 824442850104 | String |
| productName | PRCLR 1 DAY 90PK 8.70 14.20 -6.00 | String |
| manufacturer | COOPER VISION | String |
| series  ⌒ Search Field 710 | Proclear 1 Day 90 Pack  ⌒ Specific Variant 712 | String |
| baseCurve | 8.70 | String |
| diameter | 14.20 | String |
| power | -6.00 | String |
| addition | 0 | String |
| cylinder | 0 | String |
| axis | 0 | String |
| distance | 0 | String |
| color | Clear | String |
| modality | Daily | String |
| annualSupply | 4 | Int32 |
| priceRetail | 74 | Int32 |
| priceAnnual | 71 | Int32 |
| priceSemiAnnual | 73 | Int32 |
| annualRebate | 100 | Int32 |
| semiAnnualRebate | 40 | Int32 |
| mixedProductRebate | null | Null |
| upc | 824442850104 | String |
| buyingGroups | [ 1 element ] | Array |
| lastUpdated | 2016-04-11 23:20:09.867Z | Date |
| distributor | [ 5 elements ] | Array |
| abbProductId | COOPD90000000 | String |
| wvProductId | 7412 | String |
| trial | false | Boolean |
| oogpProductId | 8C07824 | String |
| normalizedParams | { 6 fields } | Object |
|   baseCurve | 8.7 | Double |
|   diameter | 14.2 | Double |
|   power | -6.0 | Double |
|   addition | 0.0 | Double |
|   cylinder | 0.0 | Double |
|   axis | 0.0 | Double |

Example of Master Catalog Entry

FIG. 7

COMPLEX CATALOG MATCH SYSTEM

BACKGROUND

Field

The present invention relates to systems that match data elements having a first complex form with data elements having a second complex form.

Description of Related Art

A difficult problem in data processing arises when requests identifying items in a complex list, such as a catalog of products of contact lens manufacturers and distributors, are presented in various forms, while the identification of the item in the list must be exact. In such systems, human error or variability can result in requests that fail to unambiguously match an item in the list. The problem is addressed typically by training of the human data entry personnel. However, as the catalog of products evolves, constant training is required.

In some environments, the items in the catalog may be identified by the data entry personnel in different ways. For example, in a system used to support sales of contact lenses, the data entry personnel are trained to utilize product identifiers that may be developed locally, and which do not match corresponding identifiers of the items in the catalog. In these systems, training of the data entry personnel is important as well. But further difficulty arises when the catalog changes and the product identifiers used at the data entry point may not change according to the catalog.

The variabilities caused by combination of the above issues: different local representations of the items, human error of data entry personnel and continuously evolving catalog entries, results in a significant number of incorrectly matched items in the catalog.

It is desirable to provide a data matching solution that can more effectively and automatically match the local variations of the data items with specific representations of corresponding data items in the catalog.

SUMMARY

A system and method is provided that can be used for operating a data matching system having a plurality of clients and a master catalog. The data matching system processes input requests from requesting clients. Each input request includes a request field that stores an input variant of a data element and a plurality of additional data fields to identify a requested entry in the master catalog. The master catalog includes entries having multiple fields including one search field storing a specific variant of the data element in the request field of input requests. The data matching system maintains client matching tables for a respective client. The entries in client matching tables match the input variants of data elements in the request field with a specific variant of the data element in the search field of a set of entries in the master catalog.

The matching system in embodiments described herein classifies a client in one of the two states: a learning phase and a post-learning phase. When the requesting client is in the learning phase, the data matching system performs a first procedure. In the first procedure, the data matching system searches plural sets of entries in the master catalog having different variants of the data element in the search field for a specific entry that matches the plurality of additional fields of current input request. The data matching system builds a client matching table in the learning phase by adding entries to the client matching table of the request client that match the input variant of the data element in the request field of the current input request with the specific variant of data element in the master search field of the set of entries of which the specific entry is a member.

In one embodiment, the searching of the plural set of entries in the master catalog includes a two-step process. The first step of the two-step process includes finding plural sets of entries in the master catalog by matching the input variant of a data element in the request field of the input requests with the specific variants of the data element in the search fields of entries in the master catalog within a similarity parameter. The process generates a confidence score for each set of the plural set of entries based on recorded data for other input requests for the particular requesting client. This matching includes matching the plurality of additional fields of one other input request to the plurality of additional fields of an entry of the set of entries. The resulting confidence score for a set of entries in the master catalog identifies a percentage of the other input requests in the recorded set that match with entries in that set. Finally, a single set of entries in the master catalog with the highest confidence score is selected and further searched for a specific entry that matches the plurality of the additional fields of the current input request.

When the requesting client is in a second state (post-learning phase), the data matching system uses a second procedure to match the current input request with a specific entry in the master catalog. In the second procedure, the data matching system uses the client matching table of the requesting client to match the current input request with a matched set of entries in the master catalog. Following this, the data matching system searches the matched set of entries for a specific entry that matches the plurality of additional fields of the current input request. Finally, the data matching system generates a response to the current input request identifying the specific entry in the matched set of entries. When the client matching table does not include a match for the current input request, the data matching system uses the first procedure described above.

Embodiments of the technology described herein, or elements thereof, can be implemented in the form of a computer product including a non-transitory computer-readable storage medium with the computer usable program code for performing the method steps indicated. Furthermore, embodiments of the invention or elements thereof can be implemented in the form of an apparatus including a memory and at least one processor that is coupled to the memory and operative to perform exemplary method steps. Yet further, in another aspect, embodiments of the invention or elements thereof can be implemented in the form of means for carrying out one or more of the procedures described herein.

A system for matching an input request from a client to a specific entry in the master catalog 160 is described, where the entries in the master catalog are complex product identifiers with many identifying fields that may not match precisely with parameters of an input request. In a configuration described herein, the system includes a first means for executing a search that has a broader scope in the master catalog for the specific entry while building the client matching table 150 using the result of the search. Elements 406, 408, and 416 of flowchart 400 in FIG. 4 correspond with, and are an example of, this first means, with details of implementation of these elements presented throughout the description. The first means can include resources to execute a two-step match process as described above. The system includes a second means for executing a search that has a more narrow scope in the master catalog using the client matching table 150 once it has been built to a suitable degree. Elements 414 and 416 in FIG. 4 correspond with, and are an example of, this second means with details of implementation of these elements presented throughout in the description.

Other aspects and advantages of the present invention can be seen on review of the drawings, the detailed description and the claims, which follow.

BRIEF DESCRIPTION OF THE DRAWINGS

FIG. 6 is an example input request from a requesting client showing a request field with an input variant of a data element and a plurality of additional fields with respective field values.

FIG. 7 is an example entry in the master catalog showing a search field with a specific variant of the data element and a plurality of additional fields with respective field values.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.
System Overview A system and various implementations for catalog matching are described with reference to FIGS. 1-8. The system and processes are described with reference to FIG. 1, an architectural level schematic of a system in accordance with an implementation. Because FIG. 1 is an architectural diagram, certain details are intentionally omitted to improve the clarity of the description.

Figure 1:
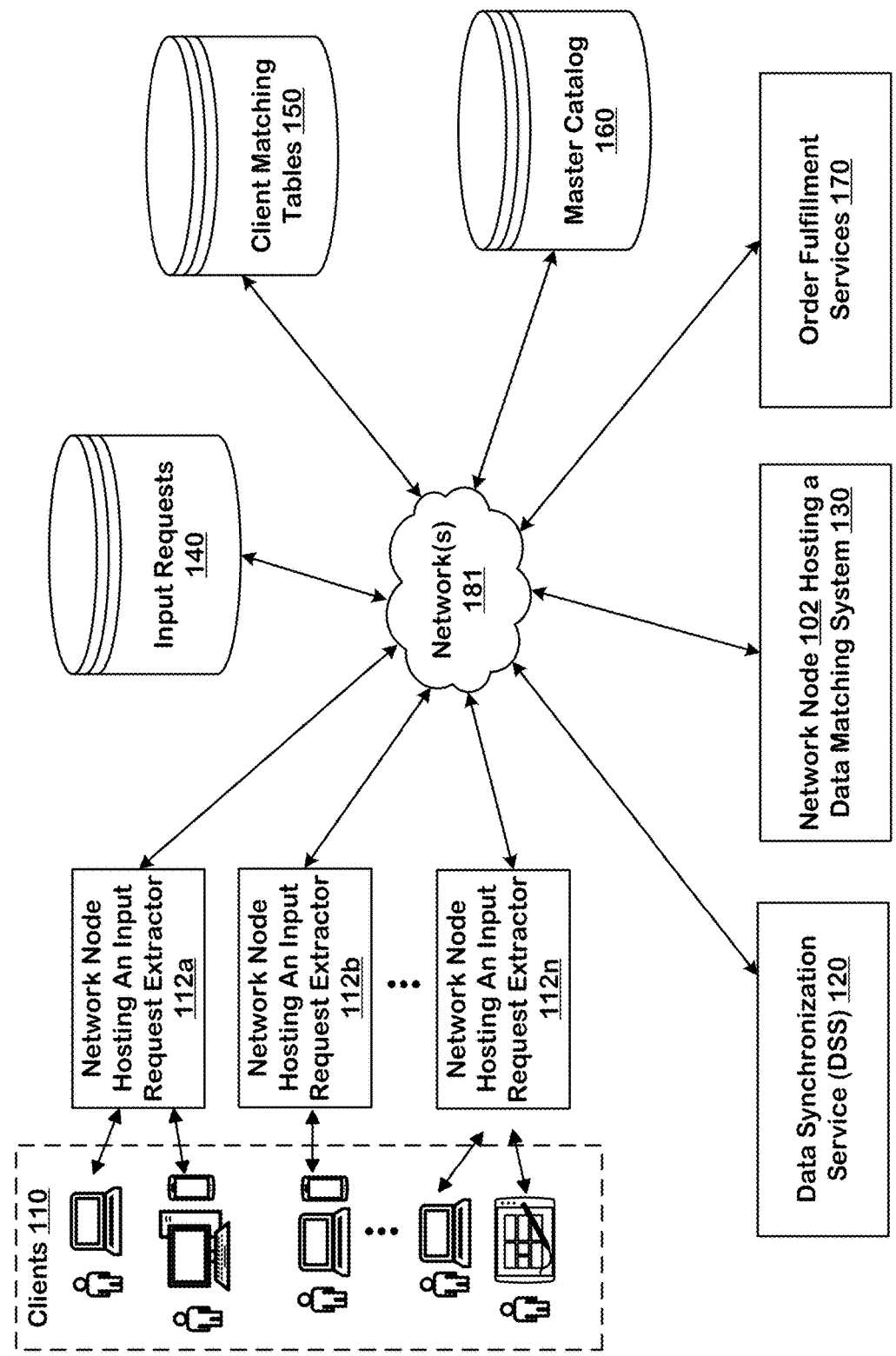
FIG. 1 illustrates an architectural level schematic of a system in which a data matching system matches input requests from clients to entries in a master catalog.

The discussion of FIG. 1 is organized as follows. First, the elements of the figure are described, followed by their interconnections. Then, the use of the elements in the system is described in greater detail.

FIG. 1 provides a block diagram level illustration of a system 100. The system 100 includes clients 110, network nodes hosting input request extractors 112a, 112b, and 112n, a data synchronization service (DSS) 120, a data matching system 130 deployed in a network node (or nodes) 102 on the network, an input requests database 140, a client matching tables database 150, a master catalog database 160, order fulfillment services 170, and public network(s) 181.

As used herein, a network node is an active electronic device or virtual device that is attached to a network, and is capable of sending, receiving, or forwarding information over a communications channel. Examples of electronic devices which can be deployed as hardware network nodes include all varieties of computers, workstations, laptop computers, handheld computers, and smartphones. Network nodes can be implemented in a cloud-based server system. More than one virtual device configured as a network node can be implemented using a single physical device.

For the sake of clarity, only three network nodes hosting input request extractors are shown in the system 100. However, any number of network nodes hosting input request extractors can be connected to the DSS 120 through the network(s) 181.

The interconnection of the elements of system 100 will now be described. Network(s) 181 couples the network nodes hosting input request extractors 112a, 112b, and 112n, the DSS 120, the network node 102 hosting the data matching system 130, the input requests database 140, the client matching tables database 150, the master catalog database 160, and the order fulfillment services 170. Clients 110 are connected to the DSS 120 through network nodes hosting input request extractors 112a, 112b, and 112n. In one embodiment, each client 110 is a computer platform enabling user input to create requests located for example in an eye care practice office. Eye care practice offices can use a practice management system (PMS) to manage their patient related data including prescriptions. Examples of PMS include, Crystal Practice Management™, Office-Mate™, Visionpro POS™. The PMS is installed in a typical configuration on a local server in an eye care practice office. Data entry personnel in the client 110 connect to the client's PMS using a variety of computing devices listed above. In one embodiment, an input request extractor 112a is deployed on the same server as the one on which the PMS is deployed. In such an embodiment, one input request extractor is deployed for one eye care practice office. One or more data entry personnel in an eye care practice office connect to the PMS to enter the patient prescription information. This data is stored in a database of the PMS.

Figure 2:
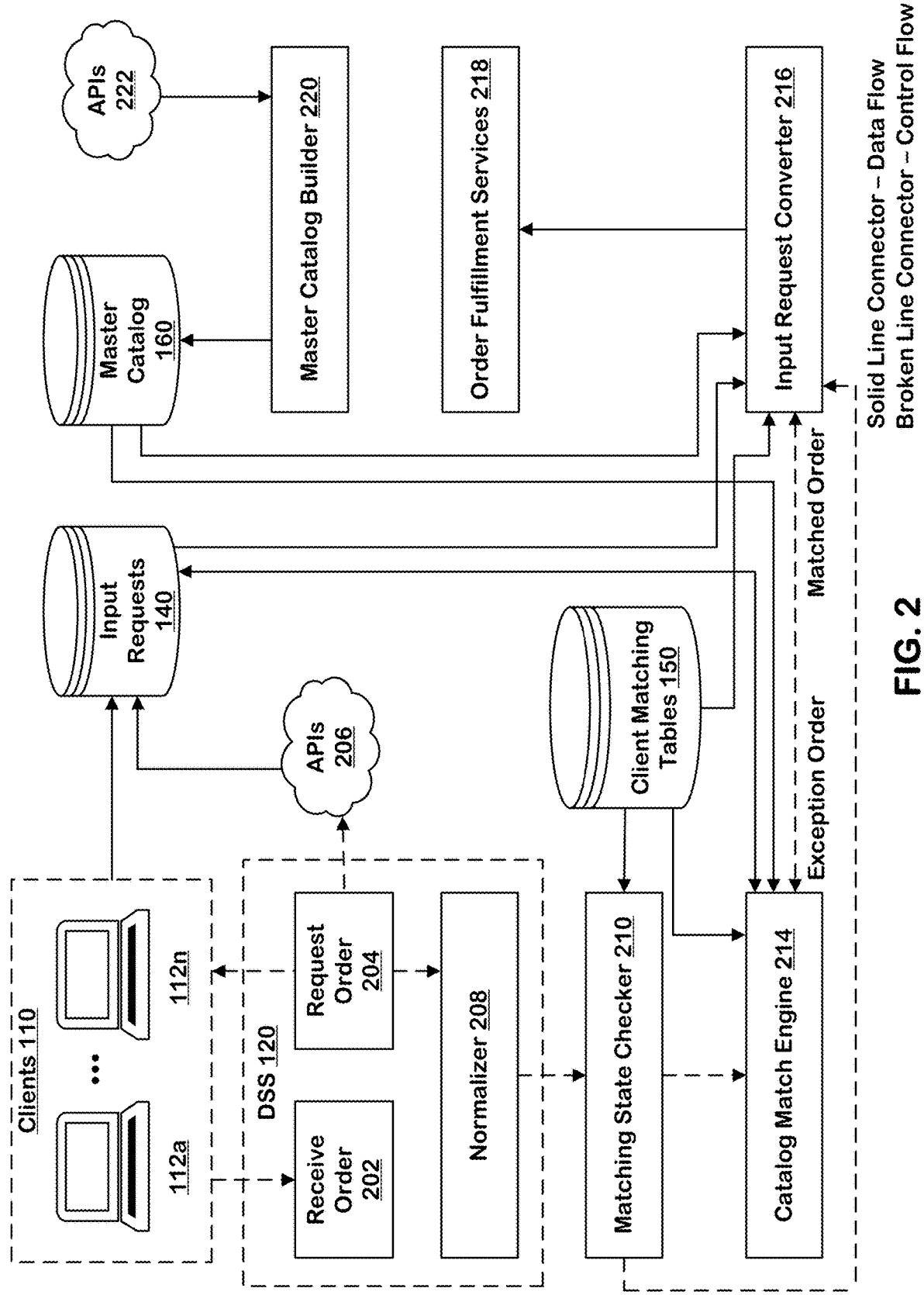
FIG. 2 is a block diagram of example modules of a system utilizing a data matching system of FIG. 1.

In another embodiment, the PMS can be implemented as a Software-as-a-Service (SaaS) application, a web-architected application or a cloud-delivered service. Examples of SaaS PMS applications include Revolution EHR™, Eyecare Advantage™, Integrity EMR for Eyes™, and Eyecom3™. SaaS applications provide functionalities to users that are implemented in the cloud, and that are the target of policies, e.g., logging in, editing user information, updating whitelists, deleting contacts from the contact list, in contrast to the offerings of simple websites and e-commerce sites. Note that a SaaS application can be supported by both web browser clients and application clients that use URL-based APIs (application programming interfaces). In such an embodiment, the DSS 120 connects to a SaaS PMS application through a specialized API for that SaaS PMS. Further details of this embodiment are depicted in FIG. 2.

The DSS 120 stores input requests received from the network nodes hosting input request extractors 112a, 112b, and 112n in the input requests database 140. The DSS maintains a separate input requests database 140 for each client 110. The data matching system 130 receives input requests from a requesting client 110 via the DSS 120 and processes the input requests into a format used to match with a specific record in the master catalog 160.

During processing of the input requests from a client 110, the data matching system 130 builds a client matching table for the client 110 and stores it in client matching tables database 150. A separate client matching table is maintained for each client 110.

The input requests processed and resolved to a specific entry in the master catalog by the data matching system 130 are sent to order fulfillment services 170 for further processing.

The actual communication path through the internet can be point-to-point over public and/or private networks. The communications can occur over a variety of networks 181, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™, Truviso™, Amazon Elasticsearch Service™, Amazon Web Services™ (AWS), IBM Info-Sphere™, Borealis™, and Yahoo! S4™.

Data Matching System

Modules of an embodiment of a data matching system, usable as system 130 of FIG. 1, are shown in FIG. 2. The data synchronization service DSS 120 includes a receive order module 202, a request order module 204 and a normalizer 208. The receive order module receives input requests from network nodes hosting input request extractors 112a, 112b, and 112n. The input request extractors are configured in some systems to send the input requests to the DSS periodically at regular intervals. The DSS 120 can also proactively connect to network nodes hosting input request extractors 112a, 112b, and 112n using request order module 204 to collect input requests. The DSS 120 can use application programming interfaces (APIs) 206 to connect to Software-as-a-Service (SaaS) applications to receive input requests. Input requests from clients 110 are saved in the input requests database 140, which can be separately maintained for each client 110. Another embodiment may be deployed for example if an eye practice office has multiple offices at different locations. In such an embodiment, a head office of the eye care practice can include a network node that collects input requests from different locations and sends multiple input requests in a file (e.g., as a comma separated values (CSV) file containing input requests arranged in rows and field values of input requests arranged in columns) to the DSS 120.

An input request received from a requesting client includes a request field storing an input variant of a data element and a plurality of additional data fields to identify a requested entry in the master catalog 160. The normalizer 208 processes the input requests to condition the data to remove inconsistencies in the data fields in input requests. For example, in one embodiment, the input requests are prescriptions for patients received from clients that are eye care practice offices. An example of a prescription (input request) in such an embodiment is shown below. The prescription has additional information such patient related data, refill information, etc. The additional information is not shown in the example shown below. The fields in this example are shown for illustrative purposes.

Input Request Example 1

```
Eye: {    "productName" : "Proclear Dailies 8.70 14.2 −6.00",
          "baseCurve" : "8.70",
          "diameter" : "14.2",
          "color" : "",
          "power" : "−6.00",
          "series" : "Proclear Dailies",
          "quantity" : 4,
          "trial" : "0"
     }
```

Due to a variety of practice management systems (PMS) used by eye care practice offices and for other reasons, different field names may be used for the same data in prescriptions. A contact lens prescribed by an eye care practitioner to a patient belongs to a "series" of contact lenses offered by a manufacturer or a distributor. In the input request example 1, the contact lens belongs to "Proclear Dailies" series. The "series" field in the input request (prescription) can be used as the request field used in the matching system. Different PMS systems may refer to this "series" field by different field names such as "product family," "product" or "series". The normalizer 208 can remove such variations in field names of input requests. It is understood that other fields or a combination of multiple fields in the input request can be used as the request field.

When prescriptions are received in bulk by the DSS 120 in a CSV file, fields may be arranged in a different order. For example, a CSV file received from one eye care practice office can have "series" field values in the first column and another eye care practice office can send "series" field values in the tenth column. The normalizer 208 identifies discrepancies in prescriptions and removes them. For example, after normalization, all prescriptions have a field value representing a single concept, arranged in one field. Other functionalities of the DSS 120 include deduplication of data. For example, by identifying and discarding the input requests previously received by the system. Normalizer 208 also identifies missing information in the input requests. For example, if patient related data is not received for a prescription, the DSS 120 will identify the missing information and stop further processing on the prescription until all required information is received.

The input request also contains a plurality of additional data fields to identify a requested entry in the master catalog 160. In the input request example 1 shown above, the additional fields are "baseCurve," "diameter," "color," "power". More additional fields may be added to the input request depending on prescription requirements. The normalizer 208 processes the input requests received from clients 110 to remove variations in names and data formats of additional fields.

The normalizer 208 sends a control signal to matching state checker 210 indicating that input requests for a requesting client are ready for processing. The matching state checker 210 checks a matching state of the requesting client, which state can be stored for example in the client matching tables database 150. The requesting client can be in one of the two matching states: a learning phase represented by a first value and a post-learning phase represented by a second value. If the client is in learning phase, the catalog match engine 214 is invoked. In the learning phase the catalog match engine 214 builds the client matching table in the client matching tables database 150 for the requesting client as it processes the input request from the requesting client.

In the post-learning phase, the client matching table for the requesting client is in a mature state i.e., it contains entries that match (majority of) the input variants of a data element in the request field with a specific variant of the data element in the search field of a set of entries in the master catalog. For example, in the eye care practice office embodiment, the entries in the client matching table for a requesting client (eye care practice office) contain request ("series") field values for the contact lens series that are commonly prescribed by the requesting client (eye care practice). In the post-learning phase, "series" field values in the client matching table are matched (for example, using foreign key and primary relationship) to a specific variant of the data element in the search field ("series") in master catalog 160.

In one embodiment, the entries in the master catalog 160 are hierarchical with one parent entry with a specific variant of the data element in the search field. This parent entry has multiple child entries with different values of the data elements in additional fields. In such an embodiment, each child record has a field that references to its parent record. An example child record in the master catalog 160 is shown below. This child record belongs to a parent record with "series: Proclear 1 Day 90 Pack". In other words, each specific (child) entry in the master catalog 160 is a member of a set of entries having the same specific variant of the data element in the search field.

Master Catalog Entry Example

{ "_id" : ObjectId("5494a67c0f65af7ed25cf992"),
    "productId" : "824442850104",
    "productName" : "PRCLR 1 DAY 90PK 8.70 14.20 −6.00",
    "manufacturer" : "COOPER VISION",
    "series" : "Proclear 1 Day 90 Pack",
    "baseCurve" : "8.70",
    "diameter" : "14.20", -continued "power" : "−6.00",
    "addition" : "0",
    "cylinder" : "0",
    "axis" : "0",
    "distance" : "0",
    "color" : "Clear",
    "modality" : "Daily",
    "annualSupply" : 4,
    "upc": "824442850104",
    "lastUpdated" : ISODate("2016-04-11T23:20:08.667Z"),
    "distributor" : [ "ABB", "WVA", "CVI", "NEWERA" ],
    "abbProductId" : "COOPD90000000",
    "wvaProductId" : "7412",
    "oogpProductId" : "BC07B24",
    "normalizedParams" : {
        "baseCurve" : 8.7,
        "diameter" : 14.2,
        "power" : −6.0,
        "addition" : 0.0,
        "cylinder" : 0.0,
        "axis" : 0.0
    }
}

The example entry (shown above) in the master catalog 160 contains the search field labelled as "series" with a specific variant "Proclear 1 Day 90 Pack". The catalog match engine 214 matches the input request from the requesting client to entries in the master catalog in a two-step matching process (details of the matching steps are described with reference to FIG. 3). If the match is successful, the catalog match engine 214 creates a new entry in the client matching table for the requesting client. This new entry contains the input variant of the data element in the request field of input request and a reference to the specific variant of the data element in the search field in the master catalog 160.

Following a successful match of an input request to a specific entry in the master catalog 160, the catalog match engine 214 sends a "matched order" signal to input request converter 216 to process the matched input request.

The matching state checker 210 can also call the input request converter 216 to process an input request when the requesting client is in the second of the two states: the post-learning phase. In this state, the input requests from the requesting client are sent directly to the input request converter 216 by-passing the catalog match engine 214. The input request converter 216 processes the input request to create a final input request containing the information combined from the input request and the master catalog entry matched to the input request. The input request converter 216 sends the final input request to order fulfillment services 218. If input request converter 216 encounters an error during creation of the final input request, it stops processing the input request and informs the catalog match engine through an "exception order" signal. The input request is saved in a pending state in the input requests database 140. The catalog match engine processes the pending input request after a period of time during which the catalog matching tables may be updated, improving the likelihood of a match in a later attempt using the pending order. The period of time after which the pending input request is re-processed can be a pre-determined time, or the period of time can be indeterminate but terminated on-demand or according to algorithms that may indicate improved likelihood of matching.

The master catalog 160 receives data from master catalog builder module 220 which in turn connects to external services through application programming interfaces (APIs)

222 to collect data. In the eye care practice office embodiment, the master catalog receives contact lens data from manufacturers and distributors of contact lenses.

Two-Step Match by Catalog Match Engine

Figure 3:
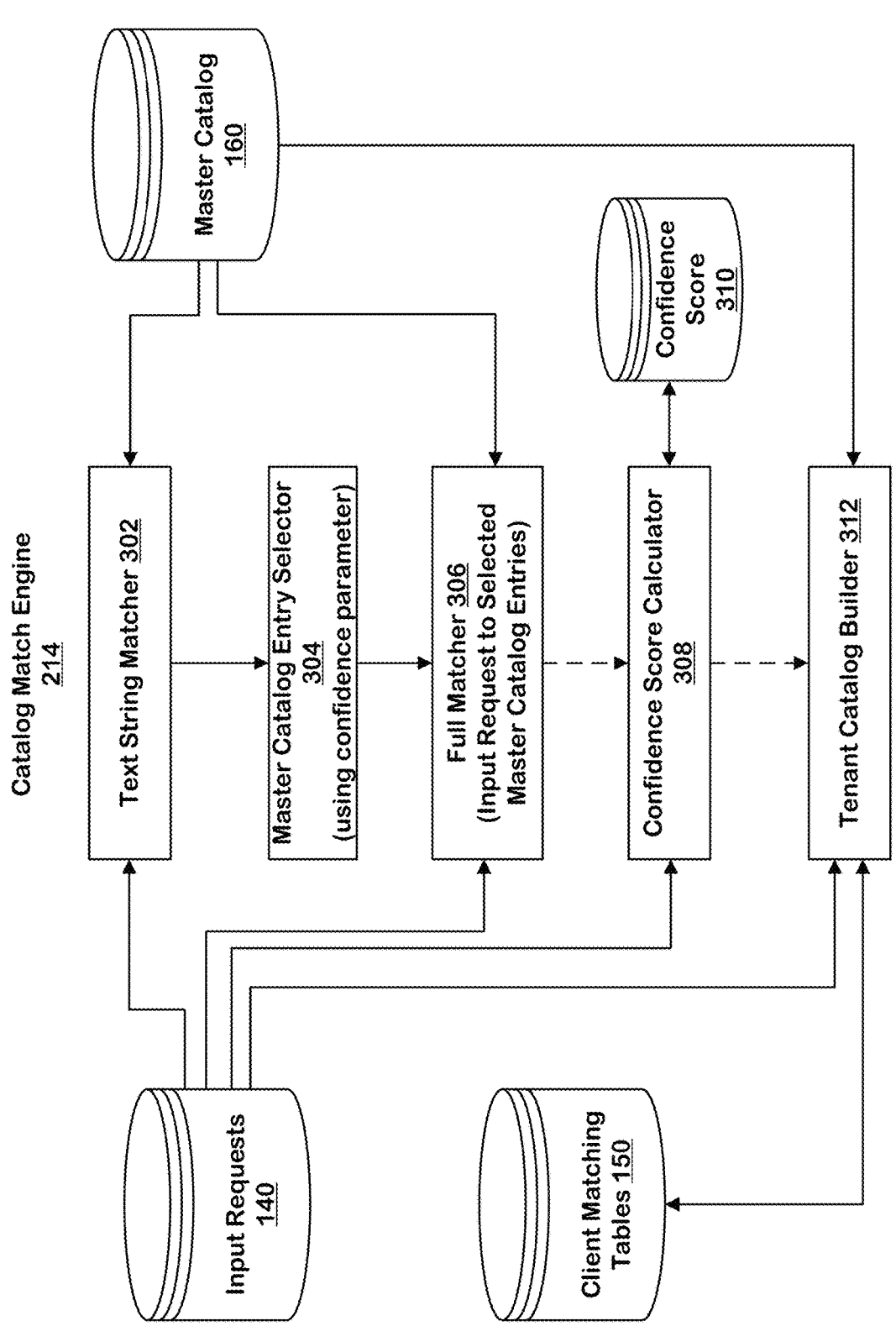
FIG. 3 is a block diagram of example modules of a catalog match engine of the data matching system of FIG. 1.

As described above, the catalog match engine 214 is invoked when the requesting client is in the learning phase. The purpose of catalog match engine 214 is two-fold: (1) match an input request to an entry in the master catalog 160 and (2) build the client matching table for the requesting client by creating a new entry containing an input variant of the data element in the request field of the current input request with the specific data element in the master search field of the matched entry in the master catalog 160. The catalog match engine 214 performs a two-step match to satisfy the first purpose in some embodiments. The example modules of catalog match engine 214 are shown in FIG. 3

First Step of Two-Step Match

In a first step of the two-step match, plural sets of entries in the master catalog are found, to narrow the search range needed to make a final match. In this example, a text string matcher 302 applies a string matching algorithm to compare an input variant of a data element in the request field of the input request to specific variants of the data elements in the search fields of entries in the master catalog. Other matching algorithms can be used to measure similarity of variants of data elements as suits a particular embodiment. In this example, a master catalog entry selector 304 uses the output of the text string matcher (or other matching logic module) to find plural sets of entries in the master catalog that match the input request within a similarity parameter, where the similarity parameter can be for example finding a number of, such as three, sets that match most closely according to the match technique utilized so that a number of most closely matching sets can be identified.

Now consider the example embodiment of eye care practice office in which an input request is a contact lens prescription for a patient. The master catalog 160 is a list of contact lens records (child entries or member entries) offered by multiple manufacturers and distributors organized under multiple "series" names (parent entries or sets of entries). The text string matcher 302 matches the "series" field value in the input request to the "series" field values of entries (parent entries or sets of entries) in the master catalog 160. The master catalog entry selector 304 selects the top three entries (parent entries or sets of entries) from the master catalog 160 based on the results of the string matching algorithm that are within the similarity parameter. In one embodiment, the text string matcher 302 uses a text string matching algorithm that calculates Jaro-Winkler distance between text string in "series" field in the input request and the text strings in "series" fields in entries of the master catalog 160. It is understood that other string matching algorithms can be used in a text string matcher, including for example, by calculating Hamming distance, Levenshtein distance, longest common substring distance etc.

Referring to input request example 1 (shown above), the request field is labeled "series" and the text string or the input variant is "Proclear Dailies." Continuing with this example, let us consider after text string matching (first step match) by text string matcher 302, the master catalog entry selector 304 selects the following three "series" as top three sets of entries in the master catalog 160.

Example Results of First Step of Two-Step Match
(Text String Matching)

First set of entries: "series": "Proclear 1 Day 90 Pack"
Second set of entries: "series": "Dailies Total 1 90 Pack"
Third set of entries: "series": "Total Dailies 90"

Second Step of Two-Step Match

A second step of the two-step match in the catalog match engine 214 is applied to search the plural sets to identify a specific entry in the master catalog for use in a response to the input request. In this example, the second step is performed by a full matcher 306 and a confidence score calculator 308. The full matcher accesses a database storing previously recorded input requests for the requesting client (for example, input requests received from the requesting client in the last one year). Each of the recorded input requests for the requesting client that had been matched to specific member entries (child entries) in the selected plural sets (three) of entries in the master catalog 160 is identified and counted. In this matching, the values of additional data fields (for example, "baseCurve," "cylinder," "diameter," "color,", "power") in recorded input requests are matched with the additional field values in the specific master catalog 160 entry (member entry or child entry) to which the recorded input request is matched.

For example, consider a recorded input request as shown below. For this input request to be considered a full match, the values of the additional data fields (for example, "baseCurve," "cylinder," "diameter," "color," "power") match to a specific member entry of a selected set of entries in the plural sets in the master catalog 160.

Input Request Example 2

Eye: { "productName" : "Total Dailies 1 8.5 14.1 −3.75",
"baseCurve" : "8.5",
"diameter" : "14.1",
"color" : "",
"power" : "−3.75",
"series" : "Total Dailies 1",
"quantity" : 4,
"trial" : "0"
}

A confidence score calculator 308 uses the results of the full matcher 306 for recorded historical data for other input requests for the particular requesting client to calculate a confidence score for the top-three sets of entries. The recorded data for other input requests for a client is saved in the client's input requests database 140. In the example embodiment of the eye care practice office, prescriptions for one year issued by the eye care practice office are saved in the history database of prescriptions in the input requests database 140. In other embodiments, prescriptions older than one year can be stored in the history database.

The confidence score for a set of entries indicates the portion of prescriptions in the history database for the requesting client that match with member entries of the set of entries in the master catalog 160. This match can include, in preferred embodiments, exactly matching the plurality of additional fields of one other input request in the history database of the requesting client to the plurality of additional fields of a member entry of the set of entries in the master catalog. The confidence score calculator calculates a percentage for each set of entries (top three sets) in the master catalog 160 using the matching procedure described above. This percentage is used as the confidence score for the set of entries. A higher percentage indicates a higher confidence score meaning a higher number of input requests from the requesting client's history database matched to entries of the set of entries. The confidence score calculator 308 saves the confidence scores for the set of entries in a confidence score database 310.

The confidence score calculator 308 compares the confidence score of the set of entries having the highest confidence score with a threshold, which can be a set threshold or a threshold that is adjusted over time. If the confidence score is higher than the threshold, the set of entries is selected for inclusion in the tenant's catalog. A tenant catalog builder 312 adds the input variant of the data element in the request field of the current input request and the specific variant of the data element in the search field of the set of entries in the master catalog 160 to the client matching tables 150.

For example, consider the embodiment of the eye care practice office that sends a prescription (input request). A part of the prescription is shown in the input request example 1 (shown above). Now further consider that in the second step of matching, the confidence score calculator identified the first set of the three sets of series (selected in the first step match and shown above) as the one having the highest confidence score which is above the set-threshold. The tenant catalog builder 312, updates the client matching tables 150 of the requesting client with "series" in input requests matched to "series" in master catalog 160 (as shown below).

Example Result of Second Step of Two-Step Match
(Confidence Score Calculation)

| Input Request Example 1 | Selected Series in Master Catalog |
|---|---|
| "series" : "Proclear Dailies" | "series" : "Proclear 1 Day 90 Pack" |
| Entry Added to Client Matching Table | |
| "series" : "Proclear Dailies"; "Proclear 1 Day 90 Pack" | |

It is understood that in other embodiments, entries in client matching tables can be created in different ways such as by including a reference to entries in a master catalog, by creating a foreign key and primary key relationship, etc. In the case where a series with the highest confidence score has a confidence score below the set-threshold, the current input request will be marked as "pending". The pending input request is re-processed by the catalog match engine 214 at a predetermined period of time or on-demand.

Process Flow of Data Matching

A number of flowcharts illustrating logic executed by a memory controller or by a memory device are described herein. The logic can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel, or performed in a different sequence, without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the embodiments, and it will be understood that numerous additional steps for accomplishing other functions can be performed before, after and between those shown.

Figure 4:
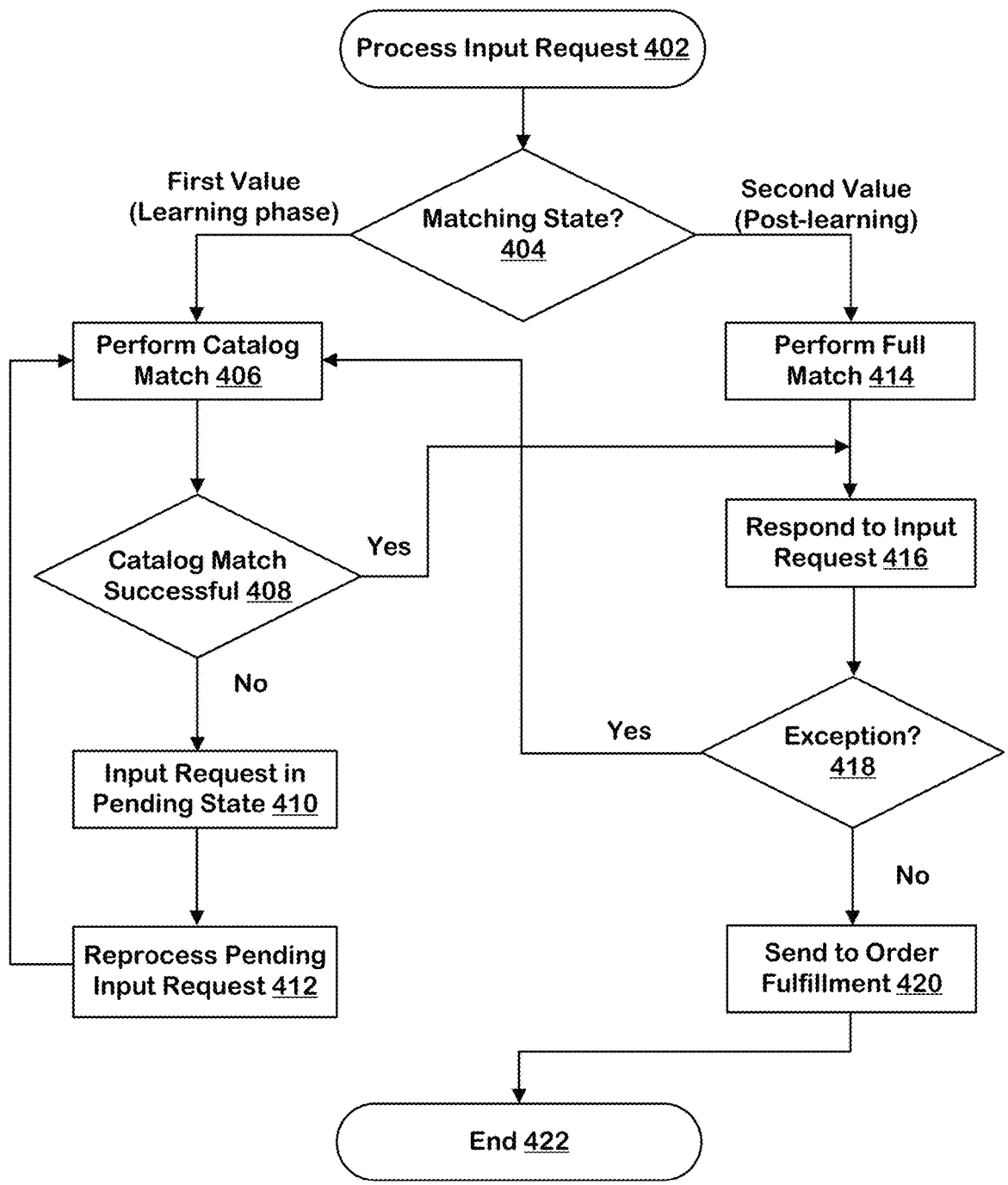
FIG. 4 is a flowchart showing process steps for matching the input requests to entries in a master catalog in two different matching states of a requesting client.

FIG. 4 is a flowchart 400 illustrating process steps for matching input requests to entries in a master catalog in two different matching states of clients 110. The process starts at step 402 when an input request from a requesting client is received. At step 404 the matching state of the requesting client is checked. If the requesting client is in the learning phase of the matching state (represented by a first value), a perform catalog match step 406 is called. At step 408, the output of the perform catalog match step 406 is checked. If the output of the perform catalog match step 406 is not successful, the input request is transitioned to a pending state (step 410). At step 412, the re-processing of pending input request is initiated by calling the perform catalog match step 406.

If the perform catalog match step 406 returns a successful match result, a respond to input request step 416 is invoked. This step provides a response to the input request, which can be utilized for example to produce a finalized request in a form for use by the order fulfillment process. If the response is generated successfully and does not raise any exception (step 418), the finalized request is sent to an order fulfillment process at step 420. The process ends at step 422.

If the requesting client is in a post-learning matching state, a perform full match step 414 is called. In this step, the data matching system uses the client matching table of the requesting client from the client matching tables database 150 to match the current input request with a matched set of entries in the master catalog. The field values of the plurality of additional fields in the current input request are matched to values of a plurality of additional fields in the member entries (child entries) of the matched set of entries in the master catalog 160. This results in a specific entry in the set of entries in the master catalog 160. The specific entry in the master catalog 160, along with the input request are converted into a finalized request in the convert input request step 416. The next steps (416 and 418) are performed as described above to complete the process at the step 422.

Figure 5:
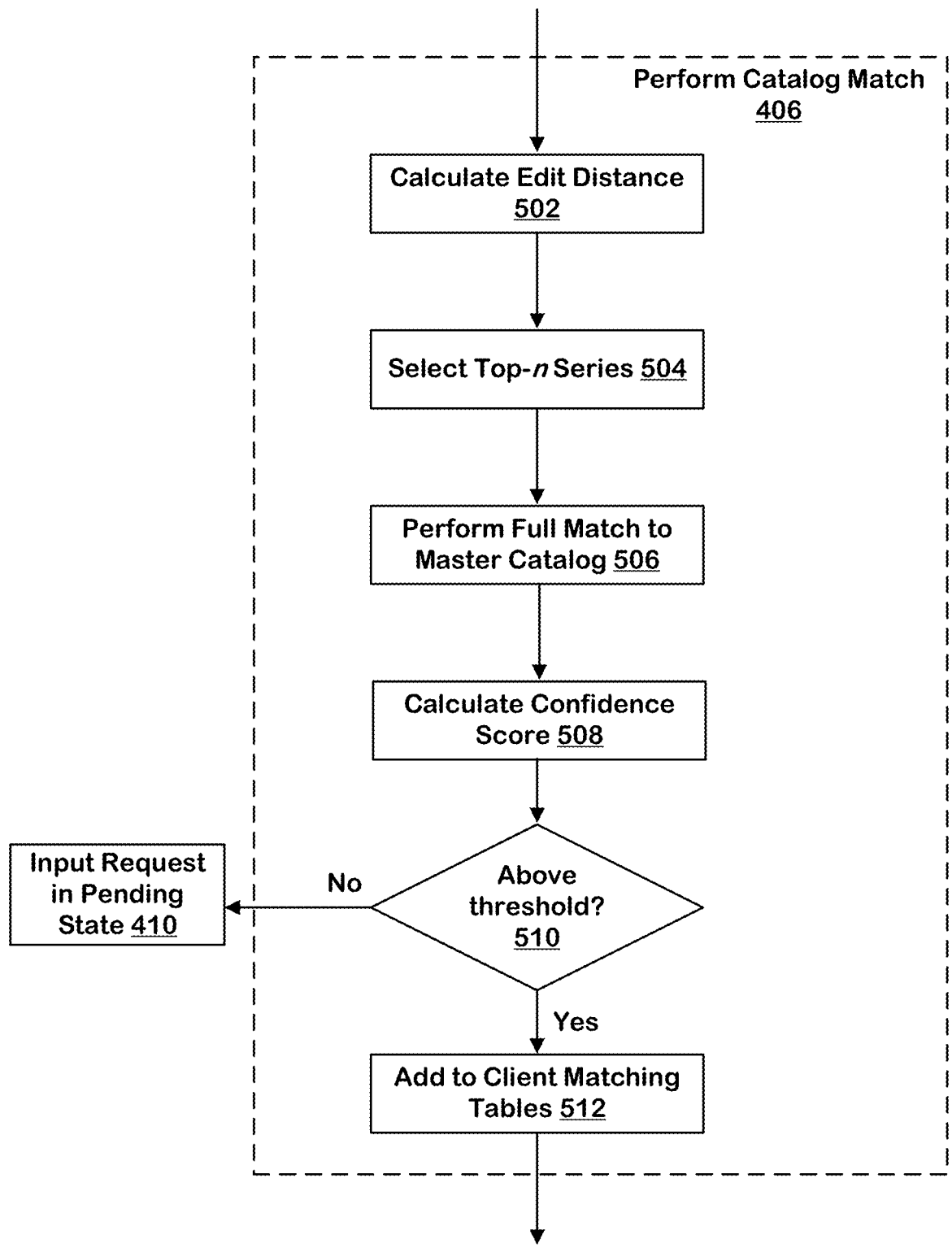
FIG. 5 is a flowchart illustrating detailed process steps for performing the catalog match step of FIG. 4.

FIG. 5 is a flowchart showing detailed steps for performing the perform catalog match step 406 of FIG. 4. A calculate edit distance step 502 uses an edit distance algorithm to calculate the edit distance between the input variant of a data element in the request field of the input request with the variant of the data element in the search field of a set of entries in the master catalog. A top-n set of entries from the master catalog is selected in step 504 using the results of the edit distance calculations in step 502. The selected sets of entries are within a similarity parameter such as the set of entries with top-3 edit distance results.

At step 506 (perform full catalog match to master catalog), recorded data for other input requests for the particular requesting client are matched with entries of each set of the multiple sets of entries selected in step 504. In this matching step, each match includes matching the plurality of additional fields of one other input request to the plurality of additional fields of an entry of the set of entries. The calculate confidence score step 508 generates a confidence score for each set of the multiple sets of entries based on recorded data for other input requests for the particular requesting client. The confidence score of a set of entries indicates a portion of other input requests that matched with entries of the set. At step 510 a single set of entries in the master catalog with the highest confidence score that is above a set-threshold is selected. If there is no set of entries with a confidence score above the set threshold, the current input request is set as pending in the step 410. If the set of entries with the highest confidence score has a confidence score above the set-threshold, a next step (512) adds a match of the input variant of the data element in the request field of the current input request with the specific data element in the master search field of the set of entries to the client matching tables 150.

FIG. 6 shows an example 600 of an input request data structure. In the example embodiment of the eye care practice office, the input request is a prescription for a patient. The example 600 only shows a part of the prescription to help readers understand the technology disclosed. The data structure includes several fields including a request field 610 and the input variant 612 of a data element. The additional fields (such as "baseCurve," "diameter," "color," and "power") represent the parameters of the contact lens prescribed to a patient. Note that the fields are repeated in "left" and "right" sections. These represent prescription details for left and right eyes of the patient.

FIG. 7 is an example 700 of a master catalog entry (partially displayed) that matched with the example input request 600. The example shows a search field 710 and a specific variant 712 of the data element. Note that values of additional fields in the example 600 match with the additional fields in the input request 600. In addition, the master catalog entry has additional fields which help the system to further process the prescription.

Network Node Hosting a Data Matching System

Figure 8:
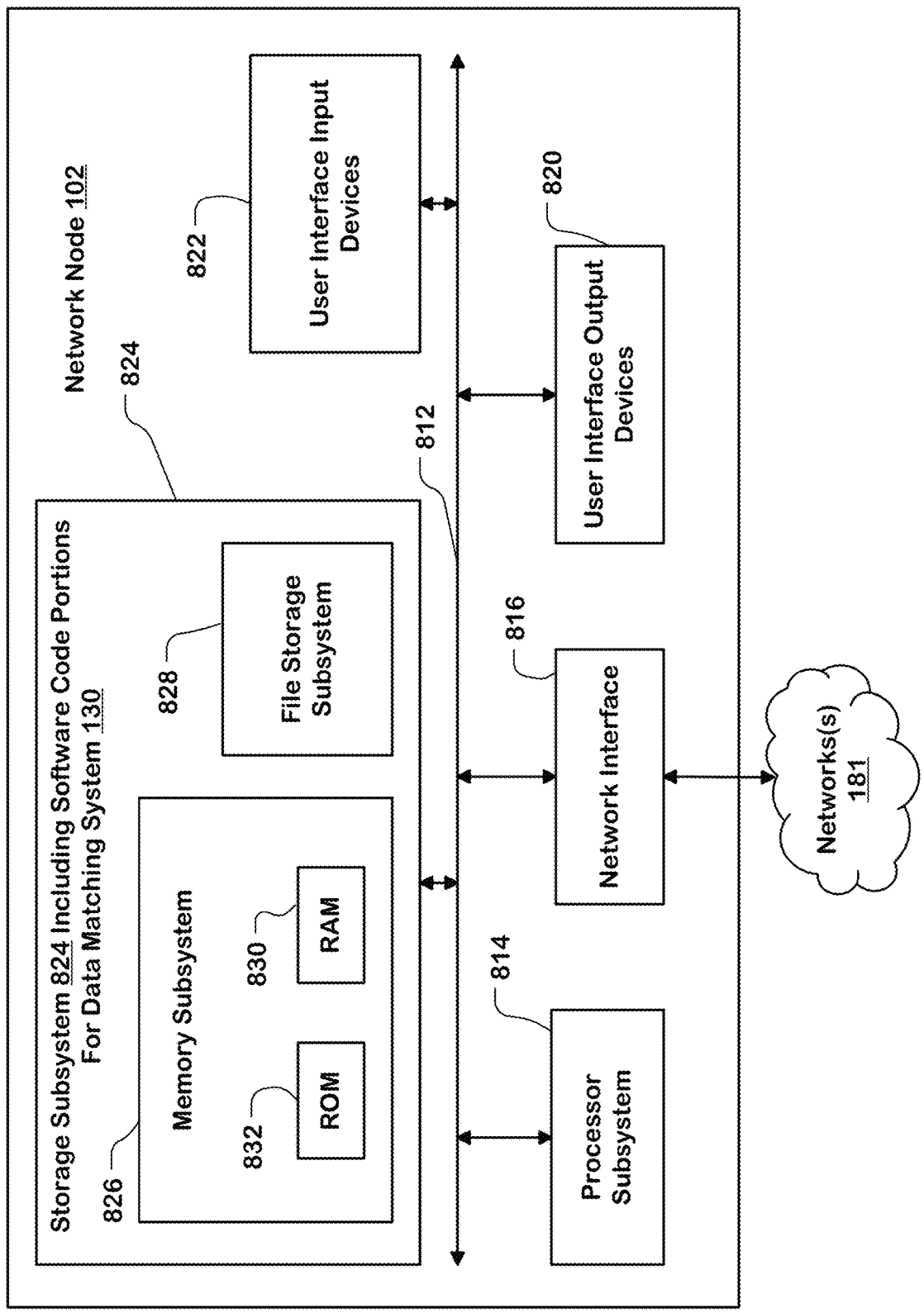
FIG. 8 is a simplified block diagram of a network node hosting the data matching system of FIG. 1.

FIG. 8 is a simplified block diagram of the network node 102 hosting the data matching system 130 of FIG. 1. Storage subsystem 824 stores the basic programming and data constructs that provide the functionality of certain embodiments of the present invention. For example, the various modules implementing the functionality of certain embodiments of the invention may be stored in storage subsystem 824. These software modules are generally executed by processor subsystem 814.

Host memory subsystem 826 typically includes a number of memories including a main random access memory (RAM) 830 for storage of instructions and data during program execution and a read-only memory (ROM) 832 in which fixed instructions are stored. File storage subsystem 828 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer-readable medium such as one or more CD-ROMs, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed. The databases and modules implementing the functionality of certain embodiments of the invention may also be stored by file storage subsystem 828. The host memory subsystem 826 contains, among other things, computer instructions which, when executed by the processor subsystem 814, cause the computer system to operate or perform functions as described herein. As used herein, processes and software that are said to run in or on "the host," "the computer" or "the network," execute on the processor subsystem 814 in response to computer instructions and data in the host memory subsystem 826 including any other local or remote storage for such instructions and data.

Bus subsystem 812 provides a mechanism for letting the various components and subsystems of network node 102 communicate with each other as intended. A number of peripheral devices such as a network interface subsystem 816, user interface output devices 820, and user interface input devices 822 communicate with the processor subsystem 814 via the bus subsystem 812. Although bus subsystem 812 is shown schematically as a single bus, alternative embodiments of the bus subsystem may use multiple busses.

Network node 102 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of network node 102 depicted in FIG. 8 is intended only as a specific example for purposes of illustrating the preferred embodiments of the present invention. Many other configurations of network node 102 are possible having more or less components than the system depicted in FIG. 8.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for operating a data matching system having a plurality of clients and a master catalog, the master catalog including entries having multiple fields including at least one search field, comprising:
processing input requests from requesting clients in the plurality of clients, each of the input requests including a request field storing an input variant of a data element and a plurality of additional data fields to identify a requested entry in the master catalog;
maintaining client matching tables for respective clients in the plurality of clients, entries in the client matching tables matching the input variants of data elements in the request field with specific variants of the data element in the search field of a set of entries in the master catalog;
the processing of input requests for a current input request of a particular requesting client, including during a learning phase using a first procedure comprising:
searching plural sets of entries having different variants of the data element in the search fields for a specific entry that matches the plurality of additional fields of the current input request, and generating a response to the current input request identifying the specific entry; and
adding the match of the input variant of the data element in the request field of the current input request with the specific variant of the data element in a master search field of the set of entries of which the specific entry is a member to the client matching table of the requesting client; and after the learning phase, using a second procedure comprising:

using the client matching table to match the current input request with a matched set of entries in the master catalog;

searching the matched set of entries for a specific entry that matches the plurality of additional fields of the current input request and generating a response to the current input request identifying the specific entry; and when the client matching table does not include a match for the current input request, using the first procedure.

2. The method of claim 1, wherein searching plural sets of entries in the master catalog includes a two-step match process.

3. The method of claim 1, wherein searching plural sets of entries in the master catalog includes:

finding the plural set of entries in the master catalog by matching within a similarity parameter, the input variant of data element in the request field of the input request with the specific variant of the data element in the search field of entries in the master catalog; and generating a confidence score for each set of the plural set of entries based on recorded data for other input requests for the particular requesting client, the confidence score indicating a portion of other input requests that matched with entries of the set; and selecting a single set of entries in the master catalog with the highest confidence score and further searching the single set of entries in the master catalog for a specific entry that matches the plurality of the additional fields of the current input request.

4. The method of claim 3, further including creating a client history database of input requests for each client.

5. The method of claim 4, further including the generating the confidence score by computing a percentage for each set of the plural set of entries using the input requests from the client history database wherein the plurality of additional fields of input requests in the client history database match with the plurality of additional fields of an entry in the set of entries in the master catalog.

6. The method of claim 5, wherein saving the input request as pending when the single set of entries in the master catalog with the highest score has a confidence score below a set threshold.

7. The method of claim 6, including re-evaluating the pending input request in the learning phase after a period of time.

8. The method of claim 1, wherein the entries in the master catalog are hierarchical with one parent entry with a specific variant of the data element in the search field having multiple child entries with different values of the data elements in additional fields.

9. The method of claim 1, further including changing from the first procedure to the second procedure based on a state of the client matching table.

10. The method of claim 1, further including normalizing the data received from a client platform to produce the input requests.

11. The method of claim 1, including selecting said plural sets of entries based on similarity of the input variant to the specific variants in the search fields of sets of entries in the master catalog.

12. The method of claim 1, wherein the input request is an order containing the series details of contact lenses prescribed to a patient by an eye practitioner.

13. The method of claim 1, wherein the master catalog contains entries for contact lenses sold by a manufacturer or a distributor organized under one or more series names.

14. A method for operating a data matching system having a plurality of clients and a master catalog, the master catalog including entries having multiple fields, including at least one search field, comprising:

processing input requests from requesting clients in the plurality of clients, each of the input requests including a request field storing an input variant of a data element and a plurality of additional data fields to identify a requested entry in the master catalog;

maintaining client matching tables for respective clients in the plurality of clients, entries in the client matching tables matching the variants of data elements in the request fields with a specific variant of the data element in the search field of a set of entries in the master catalog;

maintaining matching states for respective clients in the plurality of clients;

processing of input requests including for a current input request of a particular requesting client, when the matching state for the particular requesting client has a first value, using a first procedure comprising finding plural sets of entries in the master catalog having specific variants of the data element in the search field matching within a similarity parameter the input variant of the data element in the request field of the current input request;

generating a confidence score for each set of the plural set of entries based on recorded data for other input requests for the particular requesting client indicating a portion of other input requests that matched with entries of the set wherein each match includes matching the plurality of additional fields of one other input request to the plurality of additional fields of an entry of the set of entries;

when the confidence score of a single set of entries in the master catalog with the highest confidence score satisfies a threshold:

searching the single set of entries in the master catalog for a specific entry that matches the plurality of the additional fields of the input request in the recorded data, and generating a response to the current input request identifying the specific entry; and adding the match of the input variant of the data element in the request field of the current input request with the specific data element in a master search field of the set of entries of which the specific entry is a member to the client matching table of the requesting client; and when the confidence score of a single set of entries in the master catalog with the highest confidence score does not satisfy the threshold:

saving the current input request in a pending request table; and when a matching state for the particular requesting client has a second value, using a second procedure comprising:

using the client matching table to match the current input request with a matched set of entries in the master catalog; and searching the matched set of entries for a specific entry that matches the plurality of additional fields of the current input request, and generating a response to the current input request identifying the specific entry; and when the client matching table does not include a match for the current input request, executing the first procedure.

15. The method of claim 14, including, after a period of time, re-computing the confidence score for pending entries in the pending request table, and if the re-computed confidence score for a particular pending entry satisfies the threshold, then adding the match to the client matching table; and generating a response to the input request of the particular pending entry identifying the specific entry.

16. The method of claim 14, including maintaining a history by client of requests and responses to the requests in a database, and using the history to compute the confidence score.

17. The method of claim 14, wherein the master catalog comprises a plurality of series of items identified by corresponding series names, items in each series have item names, and a plurality of parameters defining specific items, and wherein a master text field comprises the series name of a set of items.

18. The method of claim 14, including normalizing data received from a client platform to produce the input requests.

19. A system, comprising:
one or more network nodes, where a network node of the one or more network nodes includes a communication interface, a processor or processors and memory accessible by the processor or processors;
the one or more network nodes configured for execution of a procedure for operating a data matching system having a plurality of clients and a master catalog, the master catalog including entries having multiple fields including at least one search field, comprising:
processing input requests from requesting clients in the plurality of clients, each of the input requests including a request field storing an input variant of a data element and a plurality of additional data fields to identify a requested entry in the master catalog;
maintaining client matching tables for respective clients in the plurality of clients, entries in the client matching tables matching the input variants of data elements in the request field with specific variants of the data element in the search field of a set of entries in the master catalog;
the processing of input requests for a current input request of a particular requesting client, including during a learning phase using a first procedure comprising:
searching plural sets of entries having different variants of the data element in the search fields for a specific entry that matches the plurality of additional fields of the current input request, and generating a response to the current input request identifying the specific entry; and
adding the match of the input variant of the data element in the request field of the current input request with the specific variant of the data element in the master search field of the set of entries of which the specific entry is a member to the client matching table of the requesting client;
after the learning phase, using a second procedure comprising:

using the client matching table to match the current input request with a matched set of entries in the master catalog;
searching the matched set of entries for a specific entry that matches the plurality of additional fields of the current input request and generating a response to the current input request identifying the specific entry; and
when the client matching table does not include a match for the current input request, using the first procedure.

20. The system of claim 19, wherein during the processing of input requests, searching plural sets of entries in the master catalog includes a two-step match process.

21. The system of claim 19, wherein during the processing of input requests, searching plural sets of entries in the master catalog includes:
finding the plural set of entries in the master catalog by matching within a similarity parameter, the input variant of data element in the request field of the input request with the specific variant of the data element in the search field of entries in the master catalog; and
generating a confidence score for each set of the plural set of entries based on recorded data for other input requests for the particular requesting client, the confidence score indicating a portion of other input requests that matched with entries of the set; and
selecting a single set of entries in the master catalog with the highest confidence score and further searching the single set of entries in the master catalog for a specific entry that matches the plurality of the additional fields of the current input request.

22. The system of claim 21, wherein the processing of input requests further includes creating a client history database of input requests for each client.

23. The system of claim 21, wherein the processing of input requests further includes the generating the confidence score by computing a percentage for each set of the plural set of entries using the input requests from the client history database wherein the plurality of additional fields of input requests in the client history database match with the plurality of additional fields of an entry in the set of entries in the master catalog.

24. The system of claim 23, wherein the processing of input requests further includes saving the input request as pending when the single set of entries in the master catalog with the highest score has a confidence score below a set threshold.

25. The system of claim 24, wherein the processing of input requests further includes re-evaluating the pending input request in the learning phase after a period of time.

26. The system of claim 19, wherein the entries in the master catalog are hierarchical with one parent entry with a specific variant of the data element in the search field having multiple child entries with different values of the data elements in additional fields.

27. The system of claim 19, wherein the processing of input requests further includes changing from the first procedure to the second procedure based on a state of the client matching table.

28. The system of claim 19, wherein the processing of input requests further includes normalizing the data received from a client platform to produce the input requests.

29. The system of claim 19, wherein the processing of input requests further includes selecting said plural sets of entries based on similarity of the input variant to the specific variants in the search fields of sets of entries in the master catalog.

30. The system of claim 19, wherein the input request is an order containing the series details of contact lenses prescribed to a patient by an eye practitioner.

31. The system of claim 19, wherein the master catalog contains entries for contact lenses sold by a manufacturer or a distributor organized under one or more series names.

32. A computer program product, comprising:
non-transitory machine readable memory;
a computer program stored in the memory, the computer program including instructions configured for execution of a procedure for operating a data matching system having a plurality of clients and a master catalog, the master catalog including entries having multiple fields including at least one search field, comprising:
processing input requests from requesting clients in the plurality of clients, each of the input requests including a request field storing an input variant of a data element and a plurality of additional data fields to identify a requested entry in the master catalog;
maintaining client matching tables for respective clients in the plurality of clients, entries in the client matching tables matching the input variants of data elements in the request field with specific variants of the data element in the search field of a set of entries in the master catalog;
the processing of input requests for a current input request of a particular requesting client, including during a learning phase using a first procedure comprising:
searching plural sets of entries having different variants of the data element in the search fields for a specific entry that matches the plurality of additional fields of the current input request, and generating a response to the current input request identifying the specific entry; and
adding the match of the input variant of the data element in the request field of the current input request with the specific variant of the data element in a master search field of the set of entries of which the specific entry is a member to the client matching table of the requesting client;
after the learning phase, using a second procedure comprising:
using the client matching table to match the current input request with a matched set of entries in the master catalog;
searching the matched set of entries for a specific entry that matches the plurality of additional fields of the current input request and generating a response to the current input request identifying the specific entry; and
when the client matching table does not include a match for the current input request, using the first procedure.

33. The computer program product of claim 32, wherein during the processing of input requests, searching plural sets of entries in the master catalog includes a two-step match process.

34. The computer program product of claim 32, wherein during the processing of input requests, searching plural sets of entries in the master catalog includes:
finding the plural set of entries in the master catalog by matching within a similarity parameter, the input variant of data element in the request field of the input request with the specific variant of the data element in the search field of entries in the master catalog; and
generating a confidence score for each set of the plural set of entries based on recorded data for other input requests for the particular requesting client, the confidence score indicating a portion of other input requests that matched with entries of the set; and
selecting a single set of entries in the master catalog with the highest confidence score and further searching the single set of entries in the master catalog for a specific entry that matches the plurality of the additional fields of the current input request.

35. The computer program product of claim 34, wherein the processing of input requests further includes creating a client history database of input requests for each client.

36. The computer program product of claim 35, wherein the processing of input requests further includes the generating the confidence score by computing a percentage for each set of the plural set of entries using the input requests from the client history database wherein the plurality of additional fields of input requests in the client history database match with the plurality of additional fields of an entry in the set of entries in the master catalog.

37. The computer program product of claim 36, wherein the processing of input requests further includes saving the input request as pending when the single set of entries in the master catalog with the highest score has a confidence score below a set threshold.

38. The computer program product of claim 37, wherein the processing of input requests further includes re-evaluating the pending input request in the learning phase after a period of time.

39. The computer program product of claim 32, wherein the entries in the master catalog are hierarchical with one parent entry with a specific variant of the data element in the search field having multiple child entries with different values of the data elements in additional fields.

40. The computer program product of claim 32, wherein the processing of input requests further includes changing from the first procedure to the second procedure based on a state of the client matching table.

41. The computer program product of claim 32, wherein the processing of input requests further includes normalizing the data received from a client platform to produce the input requests.

42. The computer program product of claim 32, wherein the processing of input requests further includes selecting said plural sets of entries based on similarity of the input variant to the specific variants in the search fields of sets of entries in the master catalog.

43. The computer program product of claim 32, wherein the input request is an order containing the series details of contact lenses prescribed to a patient by an eye practitioner.

44. The computer program product of claim 32, wherein the master catalog contains entries for contact lenses sold by a manufacturer or a distributor organized under one or more series names.

* * * * *